United States Patent
Poullet et al.

(10) Patent No.: US 12,462,216 B1
(45) Date of Patent: Nov. 4, 2025

(54) ENHANCED GRAPH-BASED MODELING FOR GEOGRAPHIC REGION OPTIMIZATION

(71) Applicant: Amazon Technologies, Inc., Seattle, WA (US)

(72) Inventors: Julie Marie Paule Poullet, Seattle, WA (US); Andre Cornelis Joseph Snoeck, Austin, TX (US); Daniel Esteban Merchan Duenas, Austin, TX (US); Marc Joseph Anderson, Driftwood, TX (US); Julian Enrique Pachon, Austin, TX (US); Shalini Vangala, Mount Juliet, TN (US); Mayur Rajendra Giri, Nashville, TN (US); Raj Kumar Jayapalan, Lago Vista, TX (US); Devender Kumar Gunti Venkata, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 136 days.

(21) Appl. No.: 18/473,001

(22) Filed: Sep. 22, 2023

(51) Int. Cl.
  *G06Q 10/0835* (2023.01)
  *G01C 21/00* (2006.01)
  *G01C 21/34* (2006.01)

(52) U.S. Cl.
  CPC ... *G06Q 10/08355* (2013.01); *G01C 21/3446* (2013.01); *G01C 21/3867* (2020.08)

(58) Field of Classification Search
  None
  See application file for complete search history.

(56) References Cited

U.S. PATENT DOCUMENTS

| | | | |
|---|---|---|---|
| 2019/0096253 A1* | 3/2019 | Stenneth | G08G 1/143 |
| 2020/0378775 A1* | 12/2020 | Beaurepaire | G01C 21/3423 |
| 2022/0373352 A1* | 11/2022 | Turner | G01C 21/3461 |

* cited by examiner

*Primary Examiner* — Peter D Nolan
*Assistant Examiner* — Matthew Cobb
(74) *Attorney, Agent, or Firm* — Eversheds Sutherland (US) LLP

(57) ABSTRACT

A method for graph-based modeling to optimize geographic regions using a resource-constrained objective-maximal path may include a first geographic area as a first path between a first origin location and a first destination location; encoding a second geographic area as a second path between a second origin location and a second destination location; applying a set of constraints to the first geographic area and the second geographic area to cover the jurisdiction with geographic areas, and to map respective entities to a single respective geographic area; generating a first objective-maximal path between the first origin location and the first destination location; and generating a second objective-maximal path between the second origin location and the second destination location.

20 Claims, 6 Drawing Sheets

[[30-Day Familiarity: 0.53]]

[[30-Day Familiarity: 0.70]]

ENHANCED GRAPH-BASED MODELING FOR GEOGRAPHIC REGION OPTIMIZATION

BACKGROUND

Optimizing geographic areas based on contextual constraints may be formulated as a naive mixed integer programming problem, which may become intractable to solve based on the constraints.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
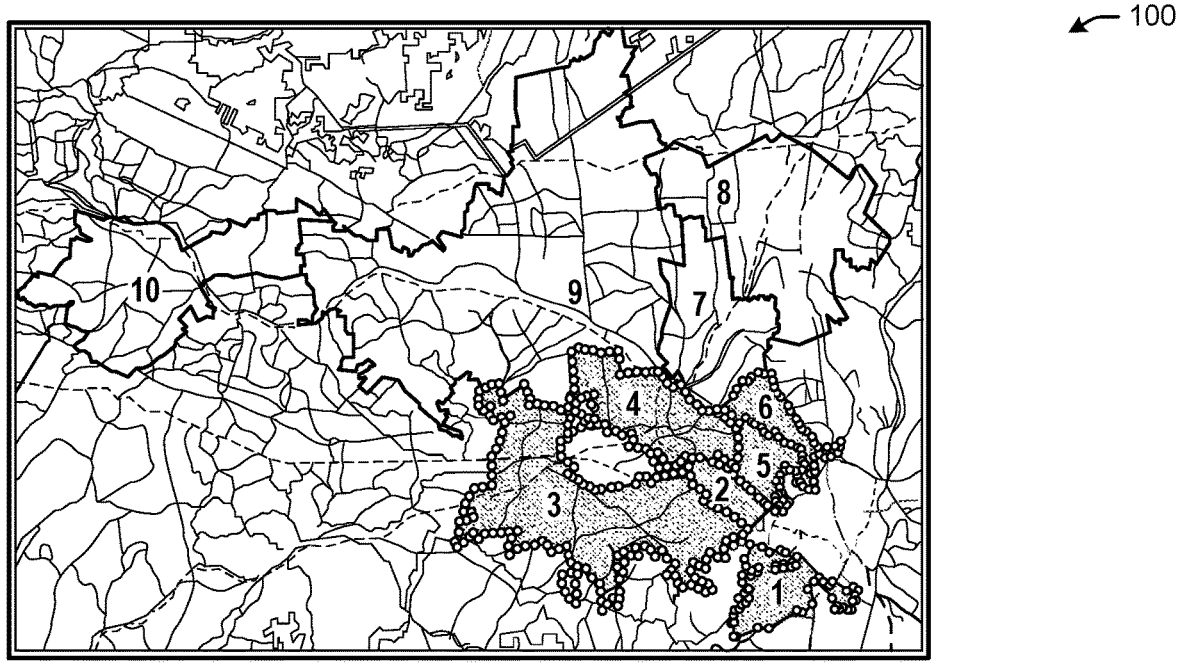
FIG. 1 illustrates example geographic areas generated using different models in accordance with one or more embodiments of the present disclosure.
Figure 1:
Figure 1:
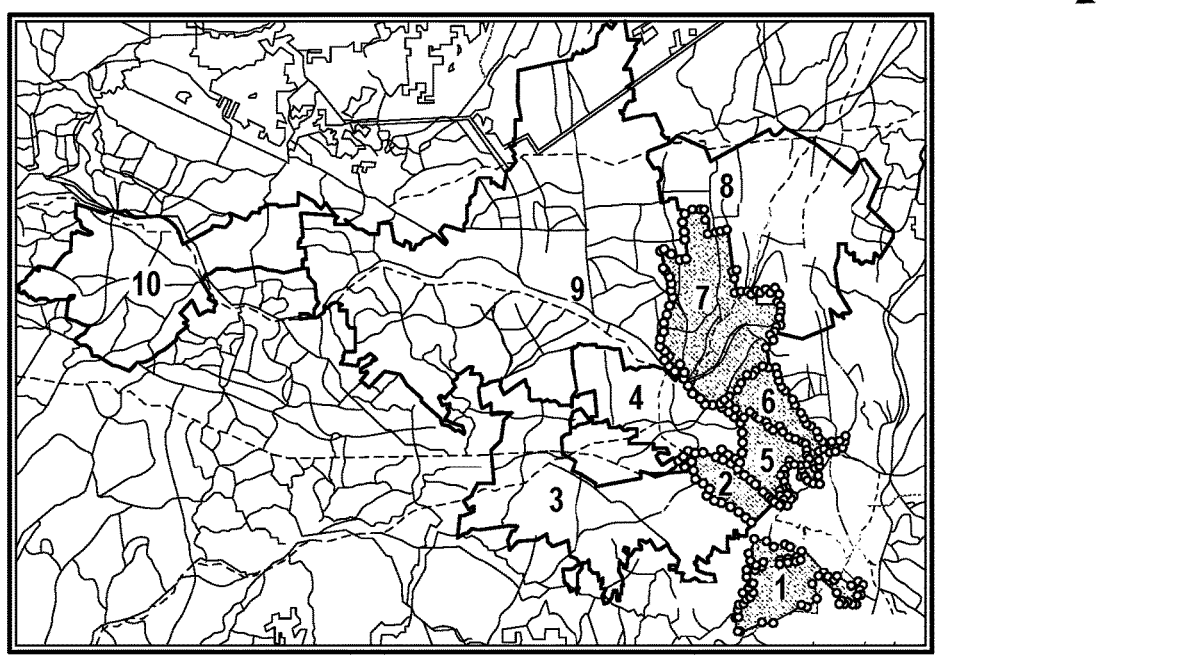

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for graph-based modeling for geographic region optimization.

Optimizing geographic regions may be useful in a variety of contexts, such as delivery routing and assignments, supply chain network design, political districting, school districting, land districting (e.g., to promote biodiversity), and the like.

For example, in delivery routing and assignments, a delivery service provider's preferred area and assignments of delivery service providers to one or more areas may be optimized to minimize the impact of delivery station changes on overall delivery driver affinity (e.g., the familiarity of a driver with a geographic area). To perform such optimization, constraints may include rightsizing the preferred areas (e.g., a delivery service provider with thirty schedule routes should have a preferred area with thirty routes), and ensuring that preferred areas are geographically contiguous to allow clustering of delivery service provider routes that allow for easy rescues. This problem may be formulated as a naive mixed integer programming problem, and solving for contiguity constraints in spatial unit allocation may be intractable.

The problem may apply to other spatial unit allocation applications. For example, within the logistics space, the enhanced techniques herein may be leveraged to generate zip-code like districts to comply with characteristics such as size, delivery/demand volume, contiguity, shape, or road-network connectivity to influence route planning or determine which areas to deliver. Additionally, the enhanced techniques herein may be used in multi-tiered supply chain network design to determine which areas should be covered by which supply chain node. The enhanced techniques herein may captures first- and middle-mile as well as last-mile logistics. Examples within the more generic field of districting include the land allocation field, i.e. the process of allocating different activities to specific units within a region, where this approach can be applied to protect the wildlife habitat in forest planning. The enhanced techniques herein may also be applied to political districting applications for determining district lines within a state, while ensuring that the population within a district is contiguous and is balanced over all districts.

In one or more embodiments, to overcome the challenge of solving a mixed integer program (MIP), the enhanced techniques herein include an innovative graph model that reduces the problem to a classical set covering problem. The enhanced techniques herein also may include a column-generation approach to solve the graph model. The approach relies on an enhanced application of resource-based bounds in a pricing sub-problem algorithm, which may be modeled as a Resource Constrained Shortest Path problem (e.g., shortest path not to be conflated with a shortest driving/walking distance). The enhanced techniques herein outperform current flow-based MIP approaches by being at least thirteen times faster, and improving the solution by 9.2% in complex instances, is more scalable, and may be applied to a variety of applications other than delivery driver assignments (e.g., as noted above).

For extending the flow-based MIP to account for EVs, and more generally to other types of resources, to assess the performance of the graph modeling approach in recommending EV-friendly PAs, the graph approach may be compared to the flow-based MIP above. The initial formulation may be extended to provide EV-friendly PAs by adding soft constraints penalizing the missing EV-friendly labor, for example. EV battery capacity may be a resource constraint, for example.

In an example for delivery route optimization, a jurisdictional change may occur for a delivery station with multiple delivery service providers. When the delivery station loses areas in one direction (e.g., northeast) and gains in another direction (e.g., west), the preferred areas for the delivery service providers may need to be adjusted for the new jurisdiction of the delivery station. Designing rightsized and contiguous preferred areas and assigning them to delivery service providers to minimize the impact to driver affinity resulting from a jurisdiction change is a complex problem, as millions, or even billions, of combinations may exist.

Similarly, with population growth in certain areas, land districting may need to be updated based on relevant constraints, resulting in a similarly complex problem with many combinations. In this manner, the enhanced techniques herein may be applied to such complex geographic area optimization problems in a variety of contexts.

In one or more embodiments, any jurisdiction (e.g., delivery station or otherwise, depending on the context) may be partitioned into smaller district-level polygons (or another geographical construct) referred to as regional geographic units (RGUs, also referred to as "geographic districts" herein), and may be served by multiple parties (e.g., delivery service providers or otherwise, depending on the context). An RGU may include a certain workload represented by $\omega_{rgu}$, and a party (e.g., a delivery service provider) may include a certain amount of labor (or other unit) represented by $l_{dsp}$, both computed as an average number of routes per day in the delivery route context. Some RGUs may be mapped exclusively to pre-defined delivery service providers (e.g., for authorized access to certain facilities). Such an RGU and its pre-defined list of delivery services providers may be denoted as $RGU_{hc} \subset RGU$ and $hc_{rgu} \subset DSP$, respectively. A preferred area may map a set of RGUs to a delivery service provider (DSP). A RGU may be mapped with a ratio $0 < r_{rgu}^{pa} \leq 1$, i.e., some RGUs may be partially mapped to a DSP. A preferred area (pa) workload may be defined as $\omega_{pa} = \Sigma_{rgu \in pa} r_{rgu}^{pa} \omega_{rgu}$. Therefore, a preferred area is feasible if it satisfies: (1) $(1-\in_l)l_{dsp} \leq \omega_{pa} \leq (1+\in_l)l_{dsp}$, where $\in_l$ indicates a maximum deviation between labor and workload to ensure that pa is rightsized for a dsp; (2) the pa is geographically contiguous (e.g., ensuring ease of rescue); (3) #{rgu∈pa s.t.$r_{rgu}^{pa} < 1$}≤2, limiting to two the number of partial RGUs (e.g., dsp overlap); and (4) ∀rgu∈pa∩$RGU_{hc}$, dsp∈$hc_{rgu}$, ensuring that only the correct pre-defined DSPs may be mapped to hard-constrained RGUs.

One or more objectives may be used for optimization, for example, a preferred area package attainment over a 30-day lookback may capture the familiarity of a DSP with a PA, and may be defined by $c_{pa}$ as the historically delivered share of volume in the pa by the DSP associated to the pa in the previous 30 days. A high $c_{pa}$ value allows for consistent assignment of drivers to the same routes, fostering affinity, and allows for dispatchers to gain experience managing the pa, fostering delivery quality and efficiency. Other objectives may include complexity, workload, and/or a combination of objectives not limited to the examples herein.

In one or more embodiments, a model may find a set S of feasible pa of maximal $c_{pa}$ such that any RGU is mapped to at most two DSPs (or some other number). The following problem is a set partitioning formulation for the geographic optimization problem:

$$x^{max} \Sigma_{pa \in PA} c_{pa} x_{pa} \quad (1a)$$

$$\text{s.t. } \Sigma_{pa \ni rgu} x_{ps} = 1, \forall rgu \in RGU \quad (1b)$$

$$\Sigma_{pa \ni dsp} x_{pa} = 1, \forall dsp \in DSP \quad (1c)$$

$$\Sigma_{pa \ni rgu} x_{pa} \leq 2, \forall rgu \in RGU \quad (1d)$$

$$x_{pa} \in \{0,1\}, \forall pa \in PA \quad (1e).$$

The binary variable $x_{pa}$ may indicate whether a feasible PA pa∈PA belongs to the solution. If so, the value of $x_{pa}=1$. The constraints of (1b) ensures that the set of PAs cover an entire jurisdiction, the constraints of (1c) ensure that any DSP is mapped to exactly one PA, and the constraints of (1d) ensure that at most two DSPs are mapped to a same RGU (e.g., overlapping RGUs).

In one or more embodiments, column generation may be used to solve the geographic optimization problem. A difficulty in solving the problem lies in enumerating PA, which is combinatorially large. Defining PA through linear programming constraints makes the problem intractable to solve. Instead, the enhanced techniques herein may use structural characteristics of Pas to approximate the geographic optimization problem as a graph problem in which PA may be modeled as a set of paths.

To reduce the geographic optimization problem to a graph problem, feasible PAs may be modeled as paths in an acyclic directed graph. The PAs may be encoded as o-d paths in a graph D=(V, A), where o and d are dummy origin and destination. To model that a set of RGUs corresponds to a PA of a given DSP, D includes #DSP sub-graphs, one per DSP. Two types of vertices may be used in V: first, vertices of the form (rgu, dsp) belonging to the sub-graph of dsp, which model rgu belonging to a DSP's PA. For hard-constrained rgu∈$RGU_{hc}$, a vertex (rgu,dsp) is created when dsp∈$hc_{rgu}$, respecting the hard-constrained rule. Second, vertices of the form (dsp), which may map dsp to a PA. There may be multiple types of arcs in A. First, arcs between o and the (dsp) vertices, which connect all sub-graphs to the origin. Second, arcs between a (dsp) vertex and (rgu,dsp) vertices, which model the start of the set of RGUs composing DSP's PA. Third, arcs between ($rgu_i$, dsp) and ($rgu_j$, dsp) vertices, if $rgu_i$ is geographically adjacent to $rgu_j$, which model PA contiguity. Fourth, arcs between (rgu,dsp) vertices and d, which connect sub-graphs to the destination. D is highly cyclic, making its structure complex. To reduce D to an acyclic graph, an RGU sequence may be precomputed and an arc may be created between ($rgu_a$, dsp) and ($rgu_b$, dsp) if $rgu_a$ and $rgu_b$ are adjacent, and $rgu_a$'s position is before $rgu_b$'s position in the sequence. The reduction approximates the geographic optimization problem, as some feasible PAs cannot be modeled as o-d paths anymore. The tractability versus optimality tradeoff is validated by numerical results.

In one or more embodiments, the enhanced approach herein models contiguity and hard-constrained rules of a feasible PA in the delivery assignment context. The model may account for rightsizing and overlapping DSP rules and overlapping RGU constraints by dividing an RGU into $n_{rgu}$ smaller elements. For example, if $n_{rgu_i}=3$, three vertices $rgu_1^1$, $rgu_1^2$, and $rgu_1^3$ may be created, and whose workload may correspond to one third of $\omega_{rgu_1}$. $n_{rgu}$ may be computed based on the maximum labor variation $\in_l$, and on the RGU workload $\omega_{rgu}$, as a tradeoff between high-granularity and a scalable graph. An o-d path respects the rightsized rule if the total workload of the rgu smaller element vertices matches the labor $l_{dsp}$ of the dsp vertex. To respect the overlapping DSP and overlapping RGU rules, the smaller $rgu_i$ vertices may be duplicated and only the first and last of them may be connected to other RGUs. For example, for two RGUs each decomposed into three elements, the modeling may respect the constraints by representing the sub-graph corresponding to one DSP. One graph may represent the modeling using one vertex per RGU, and another graph may be its counterpart using smaller elements. If the PA only partially covers $rgu_2$, then the path may need to either start or end by $rgu_2$, ensuring that at most two RGUs (e.g., the first and last in the o-d path) are partially covered (e.g., overlapping DSPs). Because elements may need to be covered exactly once, the same path may need to visit both $rgu_2^2$ and $rgu_2^3$, ensuring that at most two DSPs are mapped to the same RGU, respecting the set of overlapping RGU constraints. The modeling trades off graph size and connectivity to approximately map PA and the set of o-d paths whose DSP vertex labor is balanced with the workload of its ($rgu_i$, dsp) vertices. $P=\{p\}$ may denote the set of paths.

In one or more embodiments, for the graph-based problem statement, let $\hat{U}$ be the set of (dsp) and ($rgu_i$, dsp) vertices, i.e., $\hat{V}=V\{o, d\}$. A new formulation below may be introduced based on the graph modeling, and the difficulty in solving the formulation lies in generating a relevant set of paths $P' \subset P$, which include the optimal paths p (e.g., formulation (2)):

$$\max_x \Sigma_{p \in P} c_p x_p \quad (2a)$$

$$\text{s.t.} \; \Sigma_{p \ni v} x_p = 1, \forall v \in \hat{V} \quad (2b)$$

$$x_p \in \{0,1\}, \forall p \in P \quad (2c)$$

The binary variable $x_p$ indicates whether path $p \in P$ belongs to the solution. If so, $x_p=1$. The set of constraints in (2b) ensures that all DSPs are assigned to PA, and that all RGUs are fully covered by the set of Pas. The set is equivalent to the sets (1b) and (1c) above. The constraints (1d) are implicitly satisfied with the definition of the graph D.

In one or more embodiments, the algorithm (1) below may be used to solve the linear relaxation of formulation (2) above. One element is a sub-problem algorithm relying on tailored resource-based bounds A* algorithm as defined below. A set of initial feasible path P' may be built to cover all vertices in $\hat{V}$ by using heuristics and solving the flow-based MIP formulation. To speed up the algorithm, 100 paths of positive reduced cost, or the highest number found, are added at each iteration to P'. The way that the algorithm (1) solves the relaxation of (2) is shown below, using the upper bound and lower bound obtained when solving (2) restrained to P'. For example, the algorithm (1) may include:
Input: a graph D=(V, A) representing the PAA, a set of feasible paths $P' \subset P$ covering all the vertices in $\hat{V}$;
Repeat
  Solve the relaxation of (2) restricted to paths in P' with any standard LP solver;
  Denote $c^{low}$ its optimal value, and $\lambda_v$ the dual value associated to (2b);
  Find a path $p \in P$ whose reduced cost $\tilde{c}_p = c_p - \Sigma_{v \in p} \lambda_v$ is greater than 0 or maximal (pricing sub-problem);
  $P' \leftarrow P' \cup \{p\}$;
Until $\tilde{c}_p \geq 0$
Return $c^{low}$, $\lambda_v$ and P';

In one or more embodiments, the resource-based bounds A* algorithm may be used to solve the above pricing sub-problem. A solution scheme for the pricing sub-problem may be:

$$\max c_{p_{p \in P}} - \Sigma_{v \in P} \lambda_v \Leftrightarrow \min_{p \in P} \Sigma_{v \in P} \lambda_p - c_p \quad (3),$$

solved at the pricing sub-problem step above. The pricing sub-problem may be modeled as a resource constrained shortest path (RCSP) problem in which each arc $a=(v_o, v_i)$ is decorated with a weight $w_a$ and a resource $r_a$. For vertices of type $v_i=(rgu_i, dsp)$, set $\omega_a=\lambda_{v1}-c_{v1}$; where $c_{v1}$ is the previous 30-day window corresponding to $rgu_i$, mapped to dsp, and $r_a=\omega_{rgu_i}$. For others, $\omega_a=0$ and $r_a=0$. The weight and resource notation may be extended to a path p: $\omega_p=\Sigma_{a \in P} r_a$. Therefore, an o-d path p is feasible, belongs to P, if the rightsized rule is respected, i.e., if $(1-\in_l)l_{dsp} \leq r_p \leq (1+\in_l)l_{dsp}$, where dsp corresponds to the DSP vertex within p. The modeling may simplify the inequality to t $\leq r_p \leq 1$, where $t=\max_{dsp \in DSP} 1-2\in_l * l_{dsp}$, reducing the problem to one resource.

RCSPs are typically solved by enumeration algorithms listing o-v paths Q sub-paths of an optimal path. To reduce the number of paths enumerated, such algorithms rely on two criteria: feasibility and optimality, and specific bounds, to safely discard o-v paths. In one or more embodiments, lower bound $b_v^l$ and upper bound $b_v^u$ on the workload resource may be introduced for all v-d paths. For any v-d path R, $b_v^l \leq r_R \leq b_v^u$. Because the resources may be additive, for any o-d path P starting with an o-v path Q, $r_Q + b_v^l \leq R_p \leq r_Q + b_v^u$. Therefore, any o-v path Q may be safely discarded such that $r_Q + b_v^l > 1$ or $r_Q + b_v^u < 1-t$, as the rightsized rule of any o-d path starting by Q is violated (e.g., non-feasible). A lower bound $b_v^\omega$ on the cost for all v-d paths may be introduced. For any o-d path P starting by an o-v path Q, $\omega_Q + b_v^\omega \leq \omega_p$. Therefore, by denoting $c_{od}^{UB}$ the current shortest path weight, any o-v path Q may be safely discarded such that $\omega_Q + b_v^\omega \geq c_{od}^{UB}$ for optimality. The bounds may be computed in a pre-processing step using dynamic programming equations.

In one or more embodiments, the A* algorithm to find a path of minimum weight may be stated as $\omega_p = \Sigma_{v \in p} \lambda_v - c_p$. For any o-v path Q, a key of Q may be defined as $k_Q = \omega_Q + b_v^\omega$, which is a lower bound on the cost of an o-d path starting by Q, and can be used as an indicator of promising Q is. The A* algorithm for finding an optimal solution of the pricing sub-problem may be (Algorithm (2)):
Input: A graph D=(V, A) with weights and resources, and bounds $(b_v^l, b_v^u, b_v^\omega)_{v \in V}$ such that $b_v^l \leq r_R \leq b_v^u$ and $b_v^\omega \leq \omega_R$ for any v-d path R;
Initialization: $L \leftarrow \emptyset$; $c_{od}^{UB} \leftarrow +\infty$; P $\leftarrow$ undefined;
Add the empty path $Q_0$ at the origin o to L with label ($b_o^\omega$, 0, 0);
while L is not empty do
  Extract from L a labeled path Q, ($k_Q$, $\omega_Q$, $r_Q$) of minimum $k_Q$;
  v $\leftarrow$ last vertex of Q;
  If v=d and $\omega_Q < c_{od}^{UB}$ then
    P $\leftarrow$ Q; $c_{od}^{UB} \leftarrow \omega_Q$;
  Else
    For all a, outbound arcs of v do
      $\omega_{Q+a} \leftarrow \omega_Q + \omega_a$; $r_{Q+a} \leftarrow r_Q + r_a$; $k_{Q+a} \leftarrow \omega_{Q+a} + b_a^\omega$;
      If $k_{Q+a} < c_{od}^{UB}$, $r_{Q+a} + b_a^l \leq 1$ and $r_{Q+a} + b_a^u \geq 1-t$ then
        Add Q+a to L with label ($k_{Q+a}, \omega_{Q+a}, r_{Q+a}$);
Return P, $c_{od}^{UB}$;

The A* algorithm maintains a list L of partial solutions in the form of o-v paths Q, the best o-d path P already found, and its cost $c_{od}^{UB}$, extends each path Q based on how promising they are using $k_Q$, and checks for feasibility and optimality at the twelfth step. The efficiency of the algorithm relies on how efficiently partial paths may be discarded by the feasibility and optimality checks at the twelfth step. The graph used herein may use a specific structure: for a vertex v, there exists both low-resource v-d paths because all vertices are connected to d, and high-resource v-d paths specifically for RGU vertices with an early position in the sequence. As a result, $b^\omega$, $b^l$, and $b^u$ may be loose, and the feasibility rule is almost always true. Therefore, the optimality rule may be strengthened by improving both sides of the inequality. First, $b^\omega$ may be extended to resource-based functions $\hat{b}^\omega(.)$. For any given o-v path Q, the functions may be built such that $b_v^\omega \leq \hat{b}_v^\omega(r_Q)$, tightening the weight approximation $k_Q$. Second, while computing resource-based bounds for vertex v, the shortest v-d paths $p_v^r$ may be stored for different resource value r. An extra step may be added before step seven of the A* algorithm above to check if there exists r such that Q+a+$p_{v'}^r$ is feasible and $\omega_{Q+a}+\omega_{p_{v'}^r}<c_{od}^{UB}$, where a=(v, v'). If so, the $c_{od}^{UB}$ may be updated with $\omega_{Q+A+p_{v'}^k}$, and P with Q+a+$p_{v'}^k$, which speeds up the algorithm by making the optimality check more efficient. Combining the enumeration improvements reduces the total time of the A* algorithm above by five for large instances. How to compute the bounds and the v–d shortest paths using a dynamic programming approach are described further herein.

An original graph D=(V, A) in which arcs are created between all geographically adjacent RGUs include may cycles, is highly connected, and is undirected. Such a graph structure may represent challenges for shortest path algorithms and scalability. To reduce the original graph to a directed acyclic graph D', while preserving as many relevant feasible o–d paths present in the original graph D as possible, the RGU sequence may be precomputed as a mapping, denoted as o, between RGU and [1, #RGU]. σ(rgu)=k, where k is the position of rgu in the sequence. A' ⊂ A may be introduced to reduce the set of arcs between two rgu nodes belonging to a same sub-graph. In particular, arcs of the form $$\left(v_{(rgu_i,dsp)},v_{rgu_j,dsp)}\right)$$

belongs to A' if and only if $rgu_i$ and $rgu_j$ are geographically adjacent and σ($rgu_i$)<σ($rgu_j$), i.e., $rgu_i$'s position in the sequence is before $rgu_j$'s position. The acyclic graph D'=(V, A') may be a reduced graph. By removing cycles, the modeling simplifies the problem at the expense of optimality: not all the feasible PAs can be modeled as o–d paths in D'.

To ensure that rightsized and overlap rules and constraints are respected in the modeling, any RGU may be divided into $n_{rgu}$ components whose workload is $$\frac{\omega_{rgu}}{n_{rgu}}.$$

The number $n_{rgu}$ is a tradeoff between graph scalability and modeling granularity. The higher $n_{rgu}$ is, the closer each actual exact ratio $r_{rgu}^{pa}$ can be modeled, and the lower it is, the more tractable the graph modeling becomes as the number of vertices linearly scales with $n_{rgu}$. A minimum $n_{rgu}$ value may represent a tradeoff ensuring that the optimal solution respects the rightsized constraint when modeled using smaller RGU elements. For example, $n_{rgu}$=min ($\in_l * \min_{dsp \in DSP} l_{dsp}$, 100), in which the left side ensures that the elements are small enough to be within each DSP labor threshold, while the right side ensures that each element corresponds to at least 1%. Therefore, $n_{rgu}$ enables all feasible PA with RGU ratio above 1% to be modeled using a certain number of vertices $rgu^i$ for all DSPs.

In one or more embodiments, a flow-based MIP formulation may be implemented to solve the PAA problem:

$$\frac{\omega_{rgu}}{n_{rgu}}.$$

s.t. $\Sigma_{dsp \in DSP} x_{dsp,rgu}=1$, $\forall_{rgu} \in RGU$ $\Sigma_{dsp \in DSP} \Sigma_{rgu \in RGU} z_{dsp,rgu} \leq m$, $\Sigma_{rgu \in RGU} \Sigma_{dsp' \in DSP, dsp'!=dsp} y_{rgu,dsp,dsp'} \leq 2$, $\forall_{dsp} \in DSP$ $\Sigma_{rgu \in RGU} y_{rgu,dsp,dsp'} \leq 1$, $\forall_{dsp \in DSP}$, $\forall_{dsp'} \in DSP\{dsp\}$ $y_{rgu,dsp,dsp'} \geq z_{dsp,rgu}+z_{dsp',rgu}-1$, $\forall_{rgu} \in RGU$,
$\forall_{dsp} \in DSP$, $\forall_{dsp'}, \forall DSP\{dsp\}$ $z_{rgu,hc(rgu)}=1$, $\forall_{rgu} RGU_{hc}$ $\Sigma_{rgu \in RGU} x_{dsp,rgu} * \omega_{rgu} \leq (1+\in_l)*l_{dsp}$, $\forall_{dsp} \in DSP$ $\Sigma_{rgu \in RGU} x_{dsp,rgu} * \omega_{rgu} \geq (1-\in_l)*l_{dsp}$, $\forall_{dsp} \in DSP$ $z_{dsp,rgu} \geq x_{dsp,rgu}$, $\forall_{dsp} \in DSP$, $\forall_{rgu} \in RGU$ $$z_{dsp,rgu} \leq \frac{1}{\epsilon} x_{dsp,rgu},$$

$\forall_{dsp} \in DSP$, $\forall_{rgu} \in RGU$ $s_{dsp,rgu}=1$, $\forall_{dsp} \in DSP$ $s_{dsp,rgu} \geq \Sigma_{rgu' \in \mathcal{N}(rgu)} s_{dsp,rgu'}$, $\forall_{dsp} \in DSP$,
$\forall_{rgu} \in RGU$ $s_{dsp,rgu} \leq z_{dsp,rgu}$, $\forall_{dsp} \in DSP$, $\forall_{rqu} \in RGU$ $\Sigma_{rgu' \in \mathcal{N}(rgu)} f_{dsp,rgu',rgu} \geq z_{dsp,rgu} \geq z_{dsp,rgu}-$
$Ms_{dsp,rgu}$, $\forall_{dsp} \in DSP$, $\forall_{rgu} \in RGU$ $\Sigma_{rgu' \in \mathcal{N}(rgu)} f_{dsp,rgu,rgu'}-f_{dsp,rgu',rgu} \geq z_{dsp,rgu}-$
$Ms_{dsp,rgu}$, $\forall_{dsp} \in DSP$, $\forall_{rgu} \in RGU$ $z_{dsp,rgu} \in \{0,1\}$, $\forall_{dsp} \in DSP$, $\forall_{rgu} \in RGU$ $0 \leq x_{dsp,rgu} \leq 1$, $\forall_{dsp} \in DSP$, $\forall_{rgu} \in RGU$ $y_{dsp,rgu,rgu'} \in \{0,1\}$, $\forall_{dsp} \in DSP$, $\forall_{rgu} \in RGU$, $\forall_{rgu'} \in RGU$ $s_{dsp,rgu} \in \{0,1\}$, $\forall_{dsp} \in DSP$, $\forall_{rgu} \in RGU$ $0 \leq f_{dsp,rgu,rgu'} \leq 1$, $\forall_{dsp} \in DSP$, $\forall_{rgu} \in RGU$, $\forall_{rgu'} \in \mathcal{N}(rgu)$, Where $c_{dsp,rgu}$ corresponds to the 30-day look-back preferred area package attainment of DSP dsp with RGU rgu, m=#DSP+ #RGU−1, M is a very large number, hc(rgu) defines the dsp that is mapped to the hard constrained RGU rgu∈ $RGU_{hc}$ and $\mathcal{N}$ (rgu) corresponds to the set of RGUs adjacent to the RGU rgu. The binary variable $z_{dsp,rgu}$ indicates whether RGU rgu belongs to the PA of dsp. The binary variable $y_{rgu,dsp,dsp'}$ indicates whether the DSPs dsp and dsp' overlap in RGU rgu. If so, its value is 1. Therefore, the flow-based MIP formulation aims to maximize the 30-day look-back preferred area package attainment of the RGUs assigned as PAs to DSPs. Constraints ensure that the PAs cover all the RGUs of a station. Constraints define overlapping variables by forcing them to be of value 1 if two different DSPs are allocated to a same RGU. Constraints define the binary allocation variable, whose value is 1 if the ratio of a RGU to a DSP is above E. Constraints guarantee that, if contiguous, the PA are feasible by modeling the overlap dsp, hard-constrained, and rightsized rules, respectively. Constraints ensure that two different DSPs overlap at most once. The variables $s_{dsp,rgu}$ and $f_{dsp,rgu,rgu'}$ are used to ensure the contiguity of the PAs, and other constraints ensure the contiguity of the PAs.

In one or more embodiments, the following algorithm may solve the graph problem above:

Input: a graph D=(V, A) representing the PAA, a set of feasible paths P" ⊂ P covering all vertices in V;

Solve the linear relaxation of the graph problem above using the CG algorithm above with P'=P". Denote $c^{upp}$, $\lambda_v$, and $\hat{P}$ the values returned.

Solve the linear relaxation restricted to $\hat{P}$ using a MILP solver; denote $c^{low}$ its optimal solution.

If $c^{upp}=c^{low}$ then

Stop; return $c^{upp}$;

Add to $\hat{P}$ all the shifts p in P satisfying $\tilde{c}=c_p-\Sigma_{v\in p}\lambda_v \geq c^{low}-c^{upp}$;

Solve the linear relaxation restricted to P^ with a MILP solver;

Denote $c^{final}$ its optimal solution;

Return $c^{final}$;

At the adding step above, all paths satisfying $c_p-\Sigma_{v\in p}\lambda_v \geq c^{low}-c^{upp}$ may be identified. This may be equivalent to finding all paths satisfying $\Sigma_{v\in p}\lambda_v-c_p \leq c^{upp}-c^{low}$. To do so, a modified version of the linear relaxation may be used with a maintained list of solutions instead of the best o–d path P, and where $c_{od}^{UB}$ is initialized to $c^{upp}-c^{low}$ and not updated. In this manner, all o–d paths Q with $\omega_Q < c^{upp}-c^{low}$ may be added to the list.

In one or more embodiments, to determine $b_v^l$, $b_v^u$, and $b_v^\omega$ for all vertices v∈V, such that $b_v^l \leq r_Q \leq b_v^u$ and $\omega_Q \geq b_v^\omega$ for all v–d path Q, compute the three bounds recursively. Let $\delta^+(v)$ be the set of outbound arcs for vertex v, and $n^+(a)$ be the destination vertex of an arc a, i.e., $n^+(a)=v_i$ if $a=(v_o, v_i)$. Define $b_d^\omega=0$, $b_d^l=0$, $b_d^\omega=0$. By ordering the vertices in reverse topological order, which exists because the graph is acyclic, compute for the other vertices:

$b_v^\omega=\min_{a\in\delta^+(v)}\omega_a+b_{n^+(a)}^\omega$ $b_v^l=\min_{a\in\delta^+(v)}r_a+b_{n^+(a)}^l$ $b_v^u=\max_{a\in\delta^+(v)}r_a+b_{n^+(a)}^u$ Where $b_{n^+(a)}^\omega$, $b_{n^+(a)}^l$, $b_{n^+(a)}^u$ are well-defined because the vertices are considered in reverse topological order, and all bounds of the vertices that can be reached with an outbound arc have been computed already.

In one or more embodiments, the dynamic programming approach used to compute the bounds $b^\omega$ for all vertices may be extended. The bounds may be extended to resource-based functions $B^{107}()$ such that $\omega_Q \geq B_v^\omega(r_Q) \geq b_v^\omega$ for all v–d path Q. For computation performances, $B^\omega()$ may be modeled as a constant step function based on intervals in the form $$[k\alpha, (k+1)\alpha] \text{ for } 0 \leq k \leq \left\lceil \frac{1}{\alpha} \right\rceil,$$

where α is a pre-defined small increment of resource. Therefore, $B^\omega()$ is fully defined by $$n_\alpha = \left\lceil \frac{1}{\alpha} \right\rceil + 1$$

values. This function may be modeled as a vector B" of such size, where $B^{107}(k\alpha)$ corresponds to the kth value of $B^\omega$. For each arc a, the following $n_\alpha \times n_\alpha$ sub-diagonal matrices may be introduced:

$$I_a = \begin{bmatrix} \infty & \infty & \cdots & \cdots & \vdots \\ \vdots & \ddots & \ddots & \ddots & \vdots \\ \infty & \infty & \ddots & \ddots & \vdots \\ 1 & 0 & \ddots & \ddots & 0 \\ 0 & 1 & 0 & \ddots & \vdots \\ \vdots & \ddots & \ddots & \ddots & \vdots \\ 0 & \cdots & 0 & 1 & \cdots \end{bmatrix},$$

$$\hat{I}_a = \begin{bmatrix} \infty & \infty & \cdots & \cdots & \vdots \\ \vdots & \ddots & \ddots & \ddots & \vdots \\ \infty & \infty & \ddots & \ddots & \vdots \\ \infty & \infty & \ddots & \ddots & \vdots \\ 1 & 0 & \ddots & \ddots & 0 \\ \vdots & \ddots & \ddots & \ddots & \vdots \\ 0 & \cdots & 1 & 0 & \cdots \end{bmatrix},$$

Which are shift matrices corresponding to the resource interval shift when adding the resource $r_a$ of arc a. Denote i and î the index of the first row without ∞ values of $I_a$ and $\hat{I}_a$, respectively, and $$i = \left\lfloor \frac{r_a}{\alpha} \right\rfloor \text{ and } \hat{i} = \left\lfloor \frac{r_a}{\alpha} \right\rfloor + 1.$$

Two shift matrices may be needed as two potential respectively, and new intervals may be reached by adding arc a to a partial path Q, depending on $r_Q$. For example, assume α=0.25 and $r_a$=0.4:

$$I_a = \begin{bmatrix} \infty & \infty & \infty & \infty & \infty \\ 1 & 0 & 0 & 0 & 0 \\ 0 & 1 & 0 & 0 & 0 \\ 0 & 0 & 1 & 0 & 0 \\ 0 & 0 & 0 & 1 & 0 \end{bmatrix},$$

$$\hat{I}_a = \begin{bmatrix} \infty & \infty & \infty & \infty & \infty \\ \infty & \infty & \infty & \infty & \infty \\ 1 & 0 & 0 & 0 & 0 \\ 0 & 1 & 0 & 0 & 0 \\ 0 & 0 & 1 & 0 & 0 \end{bmatrix},$$

Where $I_\alpha$ is the shift matrix for path Q whose resource is within 0.1 of the lower bound of their interval, e.g., $r_Q$=0.06, and $\hat{I}_\alpha$ is the shift matrix for all other paths, e.g., paths whose resource $r_Q$=0.2. Then define $B_d^\omega=[0, \ldots, 0]$. By ordering the vertices in reverse topological order because the graph is acyclic, the following equation may be used to compute $B_d^\omega$ for all other vertices:

$B_d^\omega=\min_{a\in\delta^+(v)}(\omega_\alpha+\min(I_\alpha B_{n^+(a)}^\omega, \hat{I}_\alpha B_{n^+(a)}^\omega))$.

In one or more embodiments, while computing resource-based bounds, an approximated shortest v–d path $p_v^k$ for each resource k and vertex v. One intent is to tighten the right side of the optimality rule by finding a better $c^{upp}$ more quickly. In particular, compute a topological order of D, and denote p the mapping between a vertex v and its topological order j, i.e., $p(v)=j$, and $p^{-1}(j)=v$. By definition of the topological order, $p(o)=0$ and $p(d)=n_v$, where $n_v$ is the total number of nodes in the graph. Then introduce three $n_\alpha \times n_v$ matrices: (1) $W_w$ whose shortest element at row k and column j corresponds to the weight of the stored approximate shortest $p^{-1}(j)$–d path with resource in the kth interval; (2) $W_r$ whose element at row k and column j corresponds to the resource of the stored approximated shortest $p^{-1}(j)$–d path with resource in the kth interval; (3) $W_p$ whose element at row k and column j corresponds to the nodes of the stored approximated shortest $p^{-1}(j)$–d path with resource in the kth interval.

Initialize the three matrices above with ∞ values, except for row 0 and column $n_v$, which may be set to 0. Define ∞*0=0. Introduce how to backward-extend $W_r$. Let a vertex v∈V{d}, let $n^+(v)=\{n^+(a)\}_{a\lfloor\delta^+(v)}$, set the vertices of outbound adjacent to v, and let:

$$E_v = r_a + I_a W_r[p(n^+(v))]$$

$$\hat{E}_v = r_a + \hat{I}_a W_r[p(n^+(v))]$$

Where $E_v$ and $\hat{E}_v$ correspond to tentative new resource matrix of v–d paths extended from outbound adjacent vertices. In particular, the (k, v') element corresponds to the resource of the shortest v'–d paths extended using the (v, v') arc, which is tentatively in the kth resource interval. They are tentative because it is not guaranteed that the k row includes only resources within the kth interval, so the following logic may be applied to create a feasible resource matrix of v–d paths extended, as denoted by $\tilde{E}_v$:

If $\tilde{E}_v$ is within its resource interval, return it.
Else if $E_v$ is within its resource interval, return it.
Else return ∞.

In this manner, ∞ may be used to indicate that a v–d path was not found within the kth resource interval.

The same process may be repeated for extending the weight of the v–d paths. For any row k, the index j of minimal value may correspond to the adjacent output vertex v' leading to the shortest v–d path within the resource interval k. Once v' is identified, the element k, p(v) may be updated with the element (k, j) of $\tilde{E}_v$ for the resource and weight matrices, respectively, and the (k, p(v)) element of $W_p$ may be updated with the (k', p(v')) element of $W_p$ backward extended by v, where k' is the interval of the (k, p(v)) element $W_r$ minus $r_{(v,v')}$. In the linear relaxation, an extra step may be added to check if $Q+p_v^k$ for feasible resource interval k has a lower weight than $c^{upp}$. If so, $c^{upp}$ can be updated with $w_{Q+p_v^k}$ and P with $Q+p_v^k$, speeding up the algorithm by making the optimality check more efficient.

In one or more embodiments, the modeling may be reduced to one resource. By decorating each arc $a=(v_o, v_i)$ with a resource $r_a = \omega_{rgu_i}$ if $v_i$ is a rgu vertex of the form $(rgu_i, dsp)$, or 0 otherwise, an o–d path p is feasible, i.e., belongs to P, if the rightsized rule is respected, i.e., if $(1-\epsilon_l)l_{dsp} \leq r_p \leq (1+\epsilon_l)l_{dsp}$, where dsp corresponds to the DSP vertex within p. The rightsized rule is expressed by using #DSP resources, and decorating each arc $a=(v_o, v_i)$, where $v_i$ is a rgu vertex in the form $(rgu_i, dsp_j)$, with a vector resource whose only non-zero value corresponds to the index j of the $dsp_j$. For example, if $v_i=(rgu_i, dsp_3)$ and #DSP=5, then all inbounds arcs to $v_i$ are decorated with $r_a=[0,0, \omega_{rgu_i}, 0,0]$. Similarly, the lower bounds and upper bounds may be expanded to vector of bounds of size #DSP. The lower bound becomes $[(1-\epsilon_l)l_{dsp_1}, (1-\epsilon_l)l_{dsp_2}, \ldots, (1-\epsilon_l)l_{dsp_i}, \ldots]$ and the upper bound becomes $[(1+\epsilon_l)l_{dsp_1}, (1+\epsilon_l)l_{dsp_2}, \ldots, (1+\epsilon_l)l_{dsp_i}, \ldots]$.

To improve the efficiency of the algorithm, the number of resources may be reduced to 1 by adding dummy vertices with resources. A goal may be to formulate the rightsized rule as $1-t \leq r_p \leq 1$ for all o–d paths p. Without loss of generality, it may be assumed that the DSP labor and RGU workload may be expressed as a ratio of the total labor and workload, respectively. Decorate all arcs of the form (v, dsp) with the resource $1-(1+\epsilon_l)*l_{dsp}$. Therefore, an o–d path p is feasible if $1-2\epsilon_l l_{dsp} \leq r_p \leq 1$, where dsp corresponds to the dsp vertex of p. The upper bound may not be dependent on dsp.

Define $t=\max_{dsp \in DSP} 1-2\epsilon_l l_{dsp}$, and formulate the lower bound as $t \leq r_p$ for all o–d paths p. For each dsp, dummy labor vertices $n_{dsp}$ may be introduced between the origin and the dsp vertex, where $$n_{dsp} = \left\lceil \frac{t-(1-2\epsilon_l l_{dsp})}{1-t} \right\rceil.$$

For $1 \leq k \leq n_{dsp}$, the kth dummy labor vertex may be decorated with the resource $\min(k(1-t), t-(1-2\epsilon_l l_{dsp}))$. Then prove that the set of –d paths in a graph with dummy labor vertices satisfying $t \leq r_p \leq 1$ is equivalent, in terms of dsp and rgu vertices, to the set of all o–d paths in the original graph satisfying $1-2\epsilon_l l_{dsp} \leq r_p \leq 1$. Let p be a feasible path in the original graph and whose dsp vertex corresponds to $dsp_i$. Define $$k = \left\lceil \frac{\max(0, t-r_p)}{1-t} \right\rceil$$

and p' the pat p to which the kth dummy labor vertex corresponding to dsp has been added. $t-r_p \leq t-(1-2\epsilon_l l_{dsp})$ because p is feasible in the original graph, and therefore the kth dummy labor vertex is well-defined. If $r_p \geq t$, then k=0, $r_p = r'_p$ and $t \leq r'_p \leq 1$. Else:

$$r'_p = r_p + k(1-t)$$

$$r'_p = r_p + \min\left(\left\lceil \frac{1-r_p}{1-t} \right\rceil (1-t), t-(1-2\epsilon_l l_{dps})\right)$$

$$r_p + \min\left(\frac{t-r_p}{1-t}(1-t), t-(1-2\epsilon_l l_{dsp})\right) \leq r'_p \leq r_p + \left(\frac{t-r_p}{1-t}+1\right)(1-t)$$

$t \leq r'_p \leq 1$.

Let p' be feasible in the graph augmented with the dummy labor vertices. Define p the path in which the dummy labor vertex has been removed. Because the resource of the dummy vertex is less than $t-(1-2\epsilon_l l_{dsp})$, then $r_p \geq r'_p - (t-(1-2\epsilon_l l_{dsp})) \geq (1-2\epsilon_l l_{dsp})$. The upper bound inequality holds because $p \leq p' \leq 1$.

In one or more embodiments for delivery applications, the modeling may be enhanced to account for electric vehicles (EVs) used as delivery vehicles. For example, EVs are limited in operation by their battery capacity, so the enhanced techniques herein may ensure that DSPs operating EVs are assigned a PA that is EV-friendly (e.g., when an EV route may be executed without the energy constraining the route with respect to a non-EV vehicle, so the paths may be based on EV battery capacity as a constraint). One prerequisite may include identifying areas (RGUs) that have routes that may be operated by EVs without the energy limitation. To obtain an EV-friendly workload $\omega_{rqu}^{EV}$ of a given rgu∈RGU, multiply the ratio of RGUs that can be operated by EVs without the energy limitation to the total RGUs by the initial rgu workload $\omega_{rgu}$. Extend the definition of PA, the set of feasible PAs, by adding another rule: EV friendliness. For each dsp∈DSP, denote by $l_{dsp}^{EV}$, the amount of EV labor of the DSP. Then formalize the EV friendliness rule: $\Sigma_{rgu \in pa} r_{rgu}^{pa} \omega_{rgu}^{EV} \geq l_{dsp}$.

Extending the framework to EVs may include resource decoration, relaxation logic, extending the algorithm, and extending the flow-based MIP formulation to account for EVs. For resource decoration, while the graph modeling may remain identical, a resource to track availability of EV workload across a PA may be added by extending the resource of each arc a, $r_a$, to a vector of dimension two. For example, each arc may be decorated $a=(v_o, v_t)$ based on the type of its last vertex $v_t$. For vertices of type $v_i=(rgu_i, dsp)$, set $r_a=[\omega_{rgu_i}, \omega_{rgu_i}^{EV}]$. For others, set $r_a=[0,0]$. The rationale is that the first resource tracks the total amount of workload across a path, or PA, whereas the second resource tracks the total available EV-friendly workload across a path. No changes need to be made to the weight because EV fleet composition does not impact the 30-day lookback of a DSP.

For the relaxation logic for EVs, accounting for DSP fleet composition may require solving a fleet assignment problem when solving the PAs recommendation problems due to potential DSP overlap. The fleet assignment problem may be relaxed by ensuring that, independently, each DSP has enough EV-feasible workload in the proposed PA.

The RCSP algorithm above may be extended to multiple resources. Bounds $(b_v^l, b_v^u)_{v \in V}$ may be extended to two-dimensional vectors following the same logic. All operations may remain similar, and the addition may be extended to a vector addition. One change may include the feasibility check of the algorithm, in which the inequality is extended to a vector inequality: $r_{Q+a}+b_a^l \leq [1, \infty]$ and $r_{Q+a}+b_a^u \geq [1-t, 1_{dsp}^{EV}]$. The inequality remains true if and only if all element-wise comparisons are true.

Compared to existing manual techniques, the enhanced techniques herein provide multiple technical benefits. The existing techniques are not optimized for affinity, resulting in affinity decreases when a DSP PA changes (e.g., in the delivery context of the modeling). In addition, contiguity may only be guaranteed by the existing techniques in the case of a contiguous sequence.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates example geographic areas generated using different models in accordance with one or more embodiments of the present disclosure.

Referring to FIG. 1, a geographic region model 100 may be used to assign RGUs (e.g., labeled as 1-10). The shaded RGUs 1, 2, 3, 4, 5, and 6 may represent the RGUs for a first DSP. The unshaded RGUs 7, 8, 9, and 10 may represent the RGUs for a second DSP. The RGUs may be a result of a jurisdiction change, such as when a delivery station with the two DSPs loses areas in the northeast (e.g., upper right direction on the page) and gains areas in the west (e.g., left direction on the page). A geographic region model 150 using the enhanced graph-based techniques herein may be used to assign the PAs based on the same delivery station jurisdictional change. The result of the geographic region model 150 may be that the first DSP is assigned RGUs 1, 2, 5, 6, and 7, and that the second DSP is assigned RGUs 3, 4, 8, 9, and 10. The 30-day lookback familiarity for the geographic region model 100 may be 0.53, whereas the 30-day lookback familiarity for the geographic region model 150 may be 0.70 (e.g., because the geographic region model 150 results in less change from the RGUs assignments used prior to a jurisdictional change of the delivery station). In this manner, the geographic region model 150 performs better with regard to maintaining PA stability/affinity.

Figure 2:
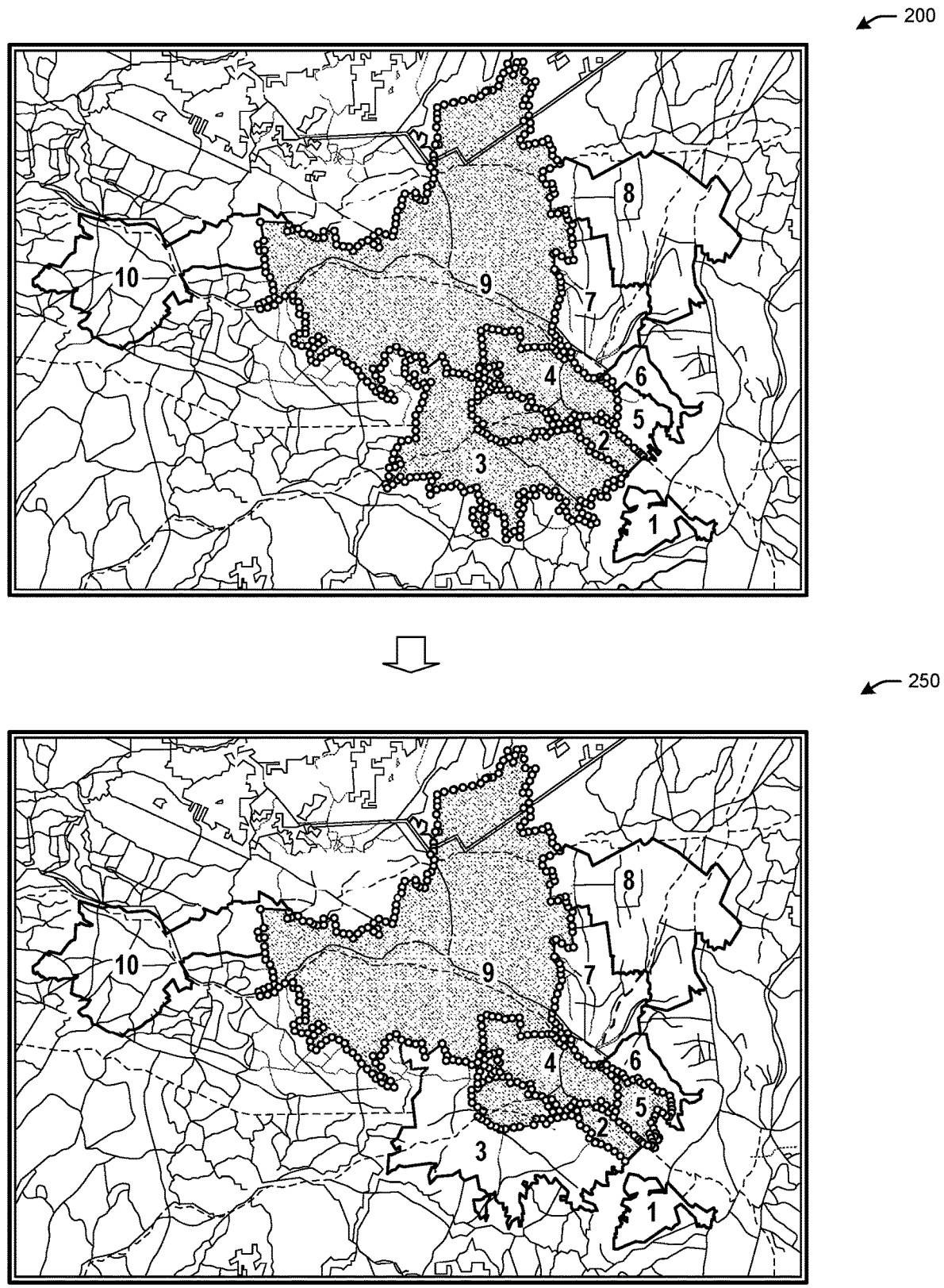
FIG. 2 illustrates example regional geographic area sequences for one of the models of FIG. 1 in accordance with one or more embodiments of the present disclosure.

FIG. 2 illustrates example regional geographic area sequences for one of the models of FIG. 1 in accordance with one or more embodiments of the present disclosure.

Referring to FIG. 2, a regional geographic area sequence 200 (e.g., RGU sequence) is shown for a path of RGU2-RGU3-RGU4-RGU9 that may be feasible for both D and D'. A regional geographic area sequence 250 (e.g., RGU sequence) is shown for a path of RGU5-RGU4-RGU9 that may be feasible for D, but not for D'.

The RGU sequence for RGU1-RGU10 is shown in FIG. 2. In this example, the number of arcs decreases by 45%, from 33 arcs in the original graph D to 18 arcs in the reduced acyclic graph D'. Recall that arcs of the form $(v_{(rgu_i,dsp)}, v_{rgu_j,dsp)})$ belongs to A' (the arcs of graph D') if and only if $rgu_i$ and $rgu_j$ are geographically adjacent and the mapping $\sigma(rgu_i) < \sigma(rgu_j)$, i.e., $rgu_i$'s position in the sequence is before $rgu_j$'s position. The RGU2-RGU3-RGU4-RGU9 path of the regional geographic area sequence 200 is feasible in both D and D', but the RGU5-RGU4-RGU9 path of the regional geographic area sequence 250 is only feasible in D despite RGU5-RGU4-RGU9 being a contiguous sequence because the arc $(rgu_5, rgu_4)$ does not exist in A' because 5>4 (RGU5 comes before RGU4).

Figure 3:
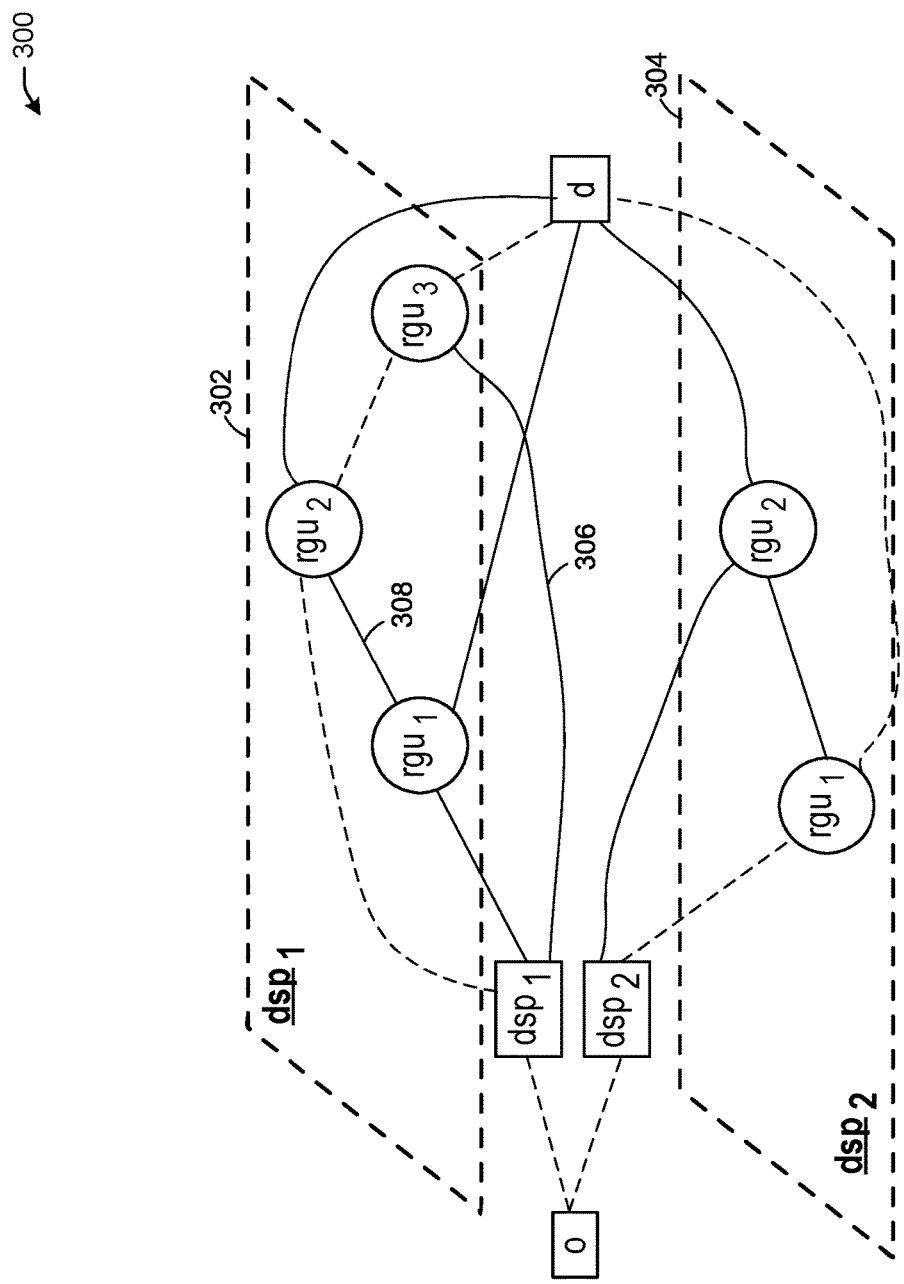
FIG. 3 illustrates an example graph-based modeling for geographic region optimization in accordance with one or more embodiments of the present disclosure.

FIG. 3 illustrates an example graph-based modeling 300 for geographic region optimization in accordance with one or more embodiments of the present disclosure.

Referring to FIG. 3, the graph-based modeling 300 shows two DSPs: DSP1 and DSP2, each with RGUs (e.g., RGU1, RGU2, and RGU3). In this example RGU3 may be hard-constrained to DSP1. A sub-graph 302 is shown for DSP1, and a sub-graph 304 is shown for DSP2. To respect the hard-constrained rule, only the vertex 306 (RGU3, DSP1) may be modeled. The graph uses approximate modeling, for example, the arc 308 (RGU2, RGU1) does not exist in any of the sub-graphs, but all feasible PAs may be modeled as o-d paths. The dashed paths represent a solution to the PAAT problem above in which DSP1 is mapped to RGU2 and RGU3, and DSP2 is mapped to RGU1.

The enhanced approach in FIG. 3 models the contiguity and hard-constrained rules of a feasible PA. To account for the rightsized and overlap DSP rules, and for the overlap GU constraints, each RGU may be divided into $n_{rgu}$ smaller elements. For example, if $n_{rgu1}=3$, vertices $rgu_1^1$, $rgu_1^2$, $rgu_1^3$ may be created and whose workload corresponds to a third of $\omega_{rgu1}$. $n_{rgu}$ may be computed based on maximum labor variation $\in_l$ and RGU workload $w_{rgu}$.

Figure 4:
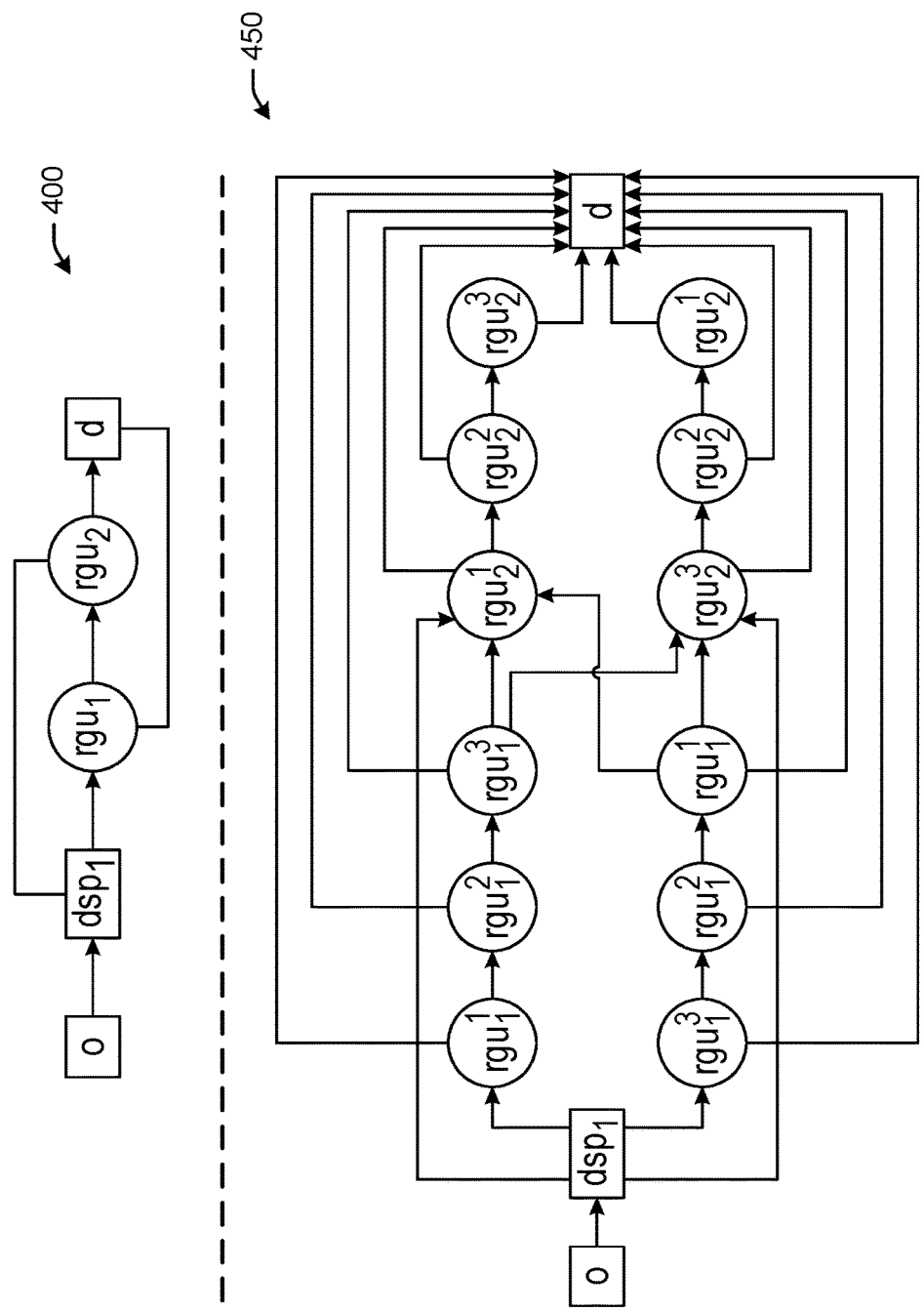
FIG. 4 illustrates an example modeling of a partial geographic region with multiple vertices in accordance with one or more embodiments of the present disclosure.

FIG. 4 illustrates an example modeling of a partial geographic region with multiple vertices in accordance with one or more embodiments of the present disclosure.

An o-d path respects the rightsized rule if the total workload of the rgu smaller element vertices matches the labor $l_{dsp}$ of the dsp vertex. To respect the overlap dsp and overlap rgu rules, each of the smaller rgu vertices may be duplicated, and only the first and last of them may be connected to other RGUs. FIG. 4 shows how the modeling respects the overlapping constraints in an example with two RGUs each decomposed into three elements by representing the sub-graph corresponding to DSP1. For example, RGU1 is decomposed into $rgu_1^1$, $rgu_1^2$, $rgu_1^3$, and RGU2 is decomposed into $rgu_2^1$, $rgu_2^2$, $rgu_2^3$. The top graph 400 represents the modeling using one vertex per RGU, and the bottom graph 450 its counterpart using the smaller decomposed elements.

If a PA only partially covers RGU2, then the path may need to either start or end by RGU2. This ensures that at most two RGUs—the first and the last in the o-d path, are partially covered (e.g., overlap dsp rule). Because all elements need to be covered exactly once, the same path may need to visit the uncovered decomposed components of RGU2 to ensure that at most two DSPs are mapped to the same RGU (e.g., overlap rgu rule).

Figure 5:
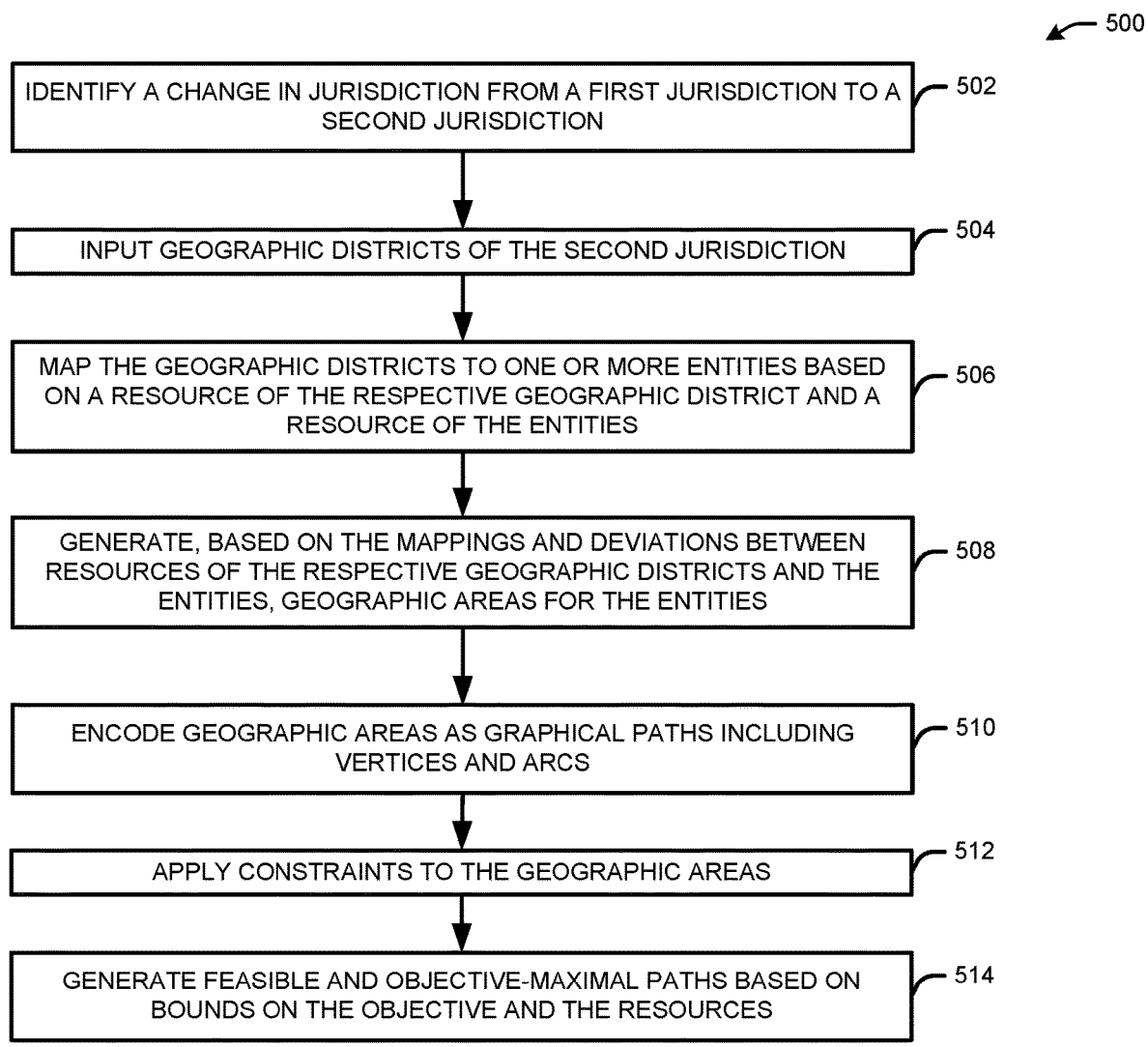
FIG. 5 is a flow diagram for an example process for geographic region optimization in accordance with one or more embodiments of the present disclosure.

FIG. 5 is a flow diagram for an example process 500 for geographic region optimization in accordance with one or more embodiments of the present disclosure.

Figure 6:
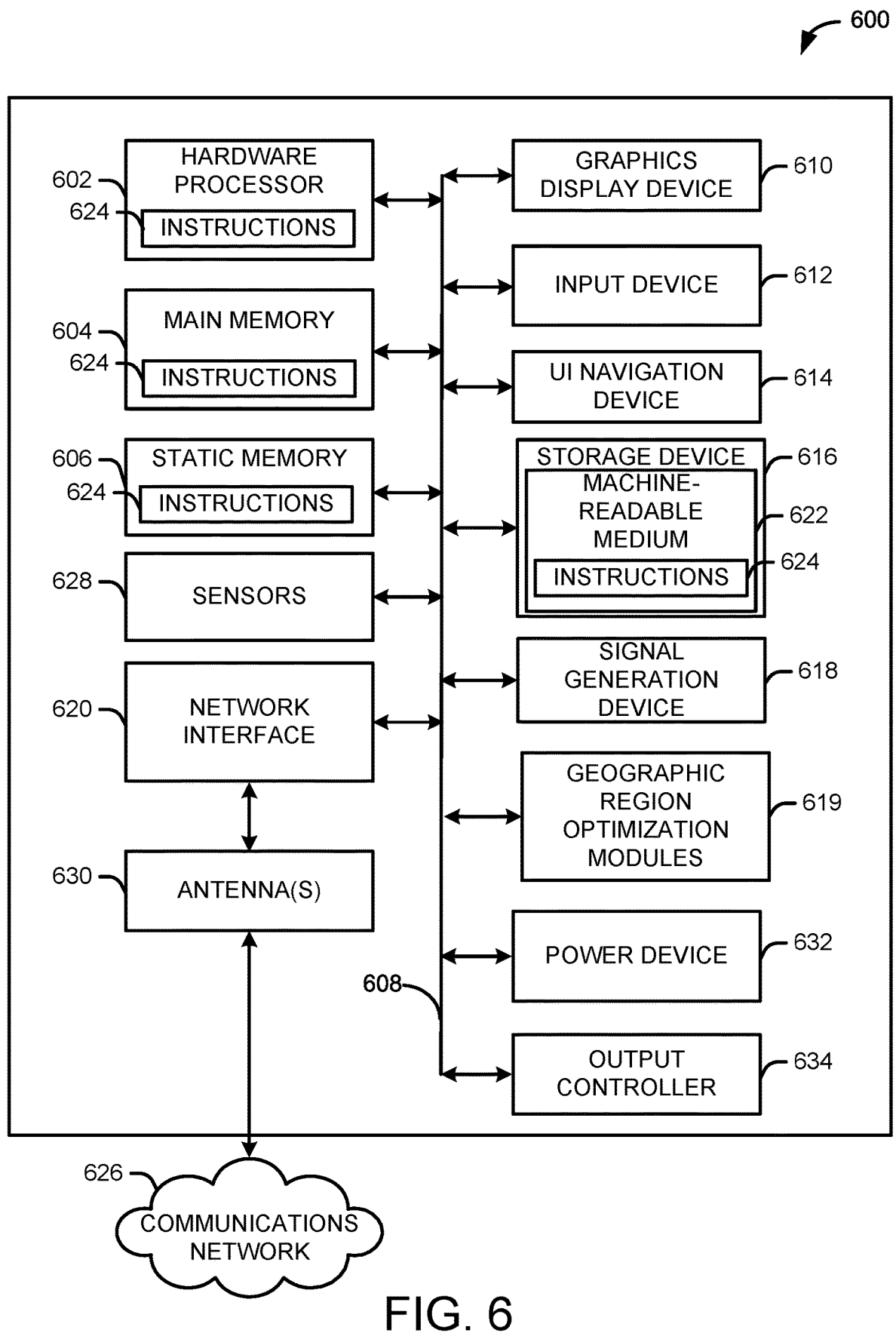
FIG. 6 illustrates a block diagram of an example machine upon which any of one or more techniques (e.g., methods) may be performed, in accordance with one or more example embodiments of the present disclosure.

At block 502, a device (or system, e.g., the geographic region optimization modules 619 of FIG. 6) may identify change in jurisdiction from a first jurisdiction including a first set of geographic areas to a second jurisdiction including a second set of geographic areas.

At block 504, the device may input geographic districts from which the second set of geographic areas have been divided, including first geographic districts for a first entity and second geographic districts for a second entity.

At block 506, the device may map a first geographic district of the first geographic districts to the entity based on a resource of the first geographic districts and a resource of the entity. The device may map a second geographic districts of the second geographic districts to the second entity based on a resource of the second geographic districts and a resource of the second entity. The device may map more than one geographic district to an entity (e.g., a third geographic district of the second geographic districts to the second entity, a fourth geographic district of the first geographic districts to the first entity, etc.). In the context of delivery route optimization, for example, the first and second entities may be DSPs of a delivery service, and the resource may be a number of delivery routes per day.

At block 508, the device may generate, based on the mapping for the first geographic district, a first deviation between the resource of the first geographic districts and the resource of the first DSP, a first geographic area for the first DSP, the first geographic area overlapping at most two geographic districts. The device may generate, based on the mapping for the second geographic district, a second deviation between the resource of the second geographic districts and the resource of the second DSP, a second geographic area for the second entity, the second geographic area overlapping at most two geographic districts.

At block 510, the device may encode the first geographic area as a first path between a first origin location and a first destination location, the first path including a first vertex of the first geographic districts and the first entity, and including a first arc between two vertices of the first path. The device may encode the second geographic area as a second path between a second origin location and a second destination location, the second path including a second vertex of the second geographic district and the second entity, and including a second arc between two vertices of the second path.

At block 512, the device may apply a set of constraints to the first geographic area and the second geographic area to cover the second jurisdiction with geographic areas, and to map respective entities to a single respective geographic area.

At block 514, the device may generate a first feasible and objective-maximal path between the first origin location and the first destination location based on upper and lower bounds of the objective and the resource of the first geographic district. The device may generate a second feasible and objective-maximal path between the second origin location and the second destination location based on upper and lower bounds of the objective and the resource of the second geographic district. In the delivery context, the first objective-maximal path may maximize a first familiarity of the DSP with the first feasible and objective-maximal path based on historically delivered volumes by the DSP to the first geographic district in a previous time window, and the second feasible and objective maximal path may maximize a second familiarity of the DSP with the second objective-maximal path based on historically delivered volumes by the DSP to the second geographic district in the previous time window.

The examples herein are not meant to be limiting.

FIG. 6 illustrates a block diagram of an example machine upon which any of one or more techniques (e.g., methods) may be performed, in accordance with one or more example embodiments of the present disclosure.

In other embodiments, the machine 600 may operate as a standalone device or may be connected (e.g., networked) to other machines. In a networked deployment, the machine 600 may operate in the capacity of a server machine, a client machine, or both in server-client network environments. The machine 600 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (Saas), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 600 (e.g., computer system) may include a hardware processor 602 (e.g., a central processing unit (CPU), a graphics processing unit (GPU), a hardware processor core, or any combination thereof), a tensor processing unit (TPU), a main memory 604 and a static memory 606, some or all of which may communicate with each other via an interlink (e.g., bus 608). The machine 600 may further include a power device 632, a graphics display device 610, an input device 612 (e.g., a keyboard), and a user interface UI navigation device 614 (e.g., a mouse). In an example, the graphics display device 610, input device 612, and UI navigation device 614 may be a touch screen display. The machine 600 may additionally include a storage device 616, a signal generation device 618, one or more geographic region optimization devices (e.g., capable of performing any of the functions shown and described in FIGS. 1-5), a network interface 620 coupled to antenna(s) 630, and one or more sensors 628. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 616 may include a machine-readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 620 may include one or more physical jacks (e.g., Ethernet, coaxial, or phone jacks) or one or more antennas to connect to the communications network 626. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for graph-based modeling to optimize geographic regions using a resource-constrained objective-maximal path, the method comprising:
   identifying, by at least one processor of a device, a change in jurisdiction for a delivery service with multiple delivery service providers from a first jurisdiction comprising a first set of geographic areas to a second jurisdiction comprising a second set of geographic areas;
   inputting, by the at least one processor, geographic districts, of the second set of geographic areas, comprising first geographic districts for a first delivery service provider (DSP) of the delivery service and second geographic districts for a second DSP of the delivery service;
   mapping, by the at least one processor, a first geographic district of the first geographic districts to the first DSP based on delivery routes per day of the first geographic district and delivery routes per day of the first DSP;
   mapping, by the at least one processor, a second geographic district and a third geographic district of the second geographic districts to the second DSP based on delivery routes per day of the second geographic district and delivery routes per day of the second DSP;
   generating, by the at least one processor, based on the mapping for the first geographic district, a first deviation between the delivery routes per day of the first geographic district and the delivery routes per day of the first DSP, a first geographically contiguous geographic area for the first DSP, the first geographically contiguous geographic area overlapping at most two geographic districts;
   generating, by the at least one processor, based on the mapping for the second geographic district, a second deviation between the delivery routes per day of the second geographic district and the delivery routes per day of the second DSP, a second geographically contiguous geographic area for the second DSP, the second geographically contiguous geographic area overlapping at most two geographic district;
   encoding, by the at least one processor, the first geographically contiguous geographic area as a first path between a first origin location and a first destination location, the first path comprising a first vertex of the first geographic district and the first DSP, and comprising a first arc between two vertices of the first path;
   encoding, by the at least one processor, the second geographically contiguous geographic area as a second path between a second origin location and a second destination location, the second path comprising a second vertex of the second geographic district and the second DSP, and comprising a second arc between two vertices of the second path;
   applying, by the at least one processor, a set of constraints to the first geographically contiguous geographic area and the second geographically contiguous geographic area to cover the second jurisdiction with geographically contiguous geographic areas, and to map respective DSPs to a single respective geographically contiguous geographic area;
   generating, by the at least one processor, a first objective-maximal path between the first origin location and the first destination location based on an upper bound of the delivery routes per day of the first geographic district and a lower bound of the delivery routes per day of the first DSP; and
   generating, by the at least one processor, a second objective-maximal path between the second origin location and the second destination location based on an upper bound of the delivery routes per day of the second geographic district and a lower bound of the delivery routes per day of the second DSP,
   wherein the first objective-maximal path maximizes a first familiarity of the DSP with the first objective-maximal path based on historically delivered volumes by the DSP to the first geographic district in a previous time window, and
   wherein the second objective-maximal path maximizes a second familiarity of the DSP with the second objective-maximal path based on historically delivered volumes by the DSP to the second geographic district in the previous time window.

2. The method of claim 1, further comprising:
   generating a first reverse topological order of vertices of the first geographically contiguous geographic area;
   determining, based on the first reverse topological order of vertices, the lower bound of the delivery routes per day of the geographic districts;
   determining, based on the first reverse topological order of vertices, the upper bound of the delivery routes per day of the geographic districts;
   generating a second reverse topological order of vertices of the second geographically contiguous geographic area;

determining, based on the second reverse topological order of vertices, the lower bound of the delivery routes per day of the second geographic district; and determining, based on the second reverse topological order of vertices, the upper bound of the delivery routes per day of the second geographic district.

3. The method of claim 2, wherein determining the lower bound of the delivery routes per day of the first geographic district is based on a sub-diagonal matrix for arcs of a graph comprising the first path.

4. The method of claim 1, further comprising:
generating a first matrix comprising a weight of the first objective-maximal path;
generating a second matrix comprising a number of delivery routes per day of the first objective-maximal path; and
generating a third matrix comprising a value indicative of nodes of the first objective-maximal path,
wherein generating the first objective-maximal path is further based on the first matrix, the second matrix, and the third matrix.

5. The method of claim 1, wherein the delivery routes per day of the first geographic district are electric vehicle delivery routes based on electric vehicle battery capacity.

6. A method for graph-based modeling to optimize geographic regions using a resource-constrained objective-maximal path, the method comprising:
encoding, by at least one processor of a device, a first geographic area as a first path between a first origin location and a first destination location, the first path comprising a first vertex of a first geographic district and a first entity of a jurisdiction, and comprising a first arc between two vertices of the first path;
encoding, by the at least one processor, a second geographic area as a second path between a second origin location and a second destination location, the second path comprising a second vertex of a second geographic district and a second entity of the jurisdiction, and comprising a second arc between two vertices of the second path;
applying, by the at least one processor, a set of constraints to the first geographic area and the second geographic area to cover the jurisdiction with geographic areas, and to map respective entities to a single respective geographic area;
generating, by the at least one processor, a first objective-maximal path between the first origin location and the first destination location based on an upper bound of a resource of the first geographic district and a lower bound of the resource of the first geographic district; and
generating, by the at least one processor, a second objective-maximal path between the second origin location and the second destination location based on an upper bound of the resource of the second geographic district and a lower bound of the resource of the second geographic district.

7. The method of claim 6, wherein the resource is associated with electric vehicle battery capacity, the method further comprising:
determining, based on a first reverse topological order of vertices of the first geographic area, the lower bound of the resource of the first geographic district; and
determining, based on the first reverse topological order of vertices, the upper bound of the resource of the first geographic district.

8. The method of claim 7, wherein determining the lower bound of the resource of the first geographic district is based on a sub-diagonal matrix for arcs of a graph comprising the first path.

9. The method of claim 6, further comprising:
generating a first matrix comprising a weight of the first objective-maximal path;
generating a second matrix comprising a number of the resource of the first objective-maximal path; and
generating a third matrix comprising a value indicative of nodes of the first objective-maximal path,
wherein generating the first objective-maximal path is further based on the first matrix, the second matrix, and the third matrix.

10. The method of claim 6, wherein the resource comprises a number of delivery routes per day.

11. The method of claim 6, wherein the resource is indicative of biodiversity.

12. The method of claim 6, wherein the resource is indicative of voting population.

13. The method of claim 6, wherein encoding the first geographic area and the second geographic area are based on a change in jurisdiction from a first jurisdiction comprising a first set of geographic areas to a second jurisdiction comprising a second set of geographic areas.

14. The method of claim 13, wherein the second set of geographic areas are divided into geographic districts comprising first geographic districts and second geographic districts, the first geographic districts comprising the first geographic district and the second geographic districts comprising the second geographic district and a third geographic district;
mapping, by the at least one processor, the first geographic district to the first entity based on the resource of the first geographic district and a resource of the first entity;
mapping, by the at least one processor, the second geographic district and the third geographic district to the second entity based on the resource of the second geographic district and of the third geographic district, and a resource of the second entity.

15. The method of claim 14, further comprising:
generating, based on the mapping for the first geographic district, a first deviation between the resource of the first geographic district and the resource of the first entity, the first geographic area; and
generating, based on the mapping for the second geographic district, a second deviation between the resource of the second geographic district and the resource of the second entity, the second geographic area.

16. A system comprising memory coupled to at least one processor of a device, wherein the at least one processor is configured to:
encode a first geographic area as a first path between a first origin location and a first destination location, the first path comprising a first vertex of a first geographic district and a first entity of a jurisdiction, and comprising a first arc between two vertices of the first path;
encode a second geographic area as a second path between a second origin location and a second destination location, the second path comprising a second vertex of a second geographic district and a second entity of the jurisdiction, and comprising a second arc between two vertices of the second path;
apply a set of constraints to the first geographic area and the second geographic area to cover the jurisdiction with geographic areas, and to map respective entities to a single respective geographic area;

generate a first objective-maximal path between the first origin location and the first destination location based on an upper bound of a resource of the first geographic district and a lower bound of the resource of the first geographic district; and generate a second objective-maximal path between the second origin location and the second destination location based on an upper bound of the resource of the second geographic district and a lower bound of the resource of the second geographic district.

17. The system of claim 16, wherein the at least one processor is further configured to:

determine, based on a first reverse topological order of vertices of the first geographic area, the lower bound of the resource of the first geographic district; and determine, based on the first reverse topological order of vertices, the upper bound of the resource of the first geographic district.

18. The system of claim 17, wherein to determine the lower bound of the resource of the first geographic district is based on a sub-diagonal matrix for arcs of a graph comprising the first path.

19. The system of claim 16, wherein the at least one processor is further configured to:

generate a first matrix comprising a weight of the first objective-maximal path;

generating a second matrix comprising a number of the resource of the first objective-maximal path; and generate a third matrix comprising a value indicative of nodes of the first objective-maximal path, wherein to generate the first objective-maximal path is further based on the first matrix, the second matrix, and the third matrix.

20. The system of claim 16, wherein the resource comprises a number of delivery routes per day.

* * * * *